US010955289B2

(12) United States Patent
Halliday et al.

(10) Patent No.: US 10,955,289 B2
(45) Date of Patent: Mar. 23, 2021

(54) ELECTRONIC MODULE INCLUDING AN AMBIENT LIGHT SENSOR STACKED OVER A PROXIMITY SENSOR

(71) Applicants: STMicroelectronics (Research & Development) Limited, Marlow (GB); STMicroelectronics (Grenoble 2) SAS, Grenoble (FR)

(72) Inventors: William Halliday, Edinburgh (GB); Eric Saugier, Froges (FR); Roy Duffy, Edinburgh (GB)

(73) Assignees: STMicroelectronics (Research & Development) Limited, Marlow (GB); STMicroelectronics (Grenoble 2) SAS, Grenoble (FR)

( * ) Notice: Subject to any disclaimer, the term of this patent is extended or adjusted under 35 U.S.C. 154(b) by 122 days.

(21) Appl. No.: 16/377,498

(22) Filed: Apr. 8, 2019

(65) Prior Publication Data

US 2019/0316959 A1    Oct. 17, 2019

(30) Foreign Application Priority Data

Apr. 11, 2018   (EP) .................................... 18305439

(51) Int. Cl.
| | |
|---|---|
| *G01J 1/42* | (2006.01) |
| *G01J 1/44* | (2006.01) |
| *G01S 7/481* | (2006.01) |
| *H04N 5/225* | (2006.01) |
| *G01S 17/04* | (2020.01) |

(52) U.S. Cl.
CPC .............. *G01J 1/4204* (2013.01); *G01J 1/44* (2013.01); *G01S 7/481* (2013.01); *G01S 17/04* (2020.01); *H04N 5/2254* (2013.01); *G01J 2001/4466* (2013.01)

(58) Field of Classification Search
CPC .......... G01J 1/4204; G01J 1/44; G01S 7/481; G01S 17/04; H04N 5/2254
USPC ............................... 250/214 AL, 214 R, 239
See application file for complete search history.

(56) References Cited

U.S. PATENT DOCUMENTS

| 8,097,852 B2 * | 1/2012 | Yao ....................... G01S 7/4813 |
| | | 250/339.01 |
| 2008/0006762 A1 | 1/2008 | Fadell et al. |
| 2014/0252209 A1 | 9/2014 | Land et al. |

FOREIGN PATENT DOCUMENTS

| CN | 1652335 A | 8/2005 |
| CN | 101936752 A | 1/2011 |
| CN | 103515371 A | 1/2014 |

(Continued)

OTHER PUBLICATIONS

EPO Partial Search Report and Written Opinion for EP 18305439.4 dated Nov. 6, 2018 (14 pages).

(Continued)

*Primary Examiner* — Que Tan Le
(74) *Attorney, Agent, or Firm* — Crowe & Dunlevy

(57) ABSTRACT

An electronic module includes an ambient light sensor and a proximity sensor. The ambient light sensor includes an ambient light photodetector. The proximity sensor includes an infrared photoemitter, a reference infrared photodetector and another infrared photodetector. The ambient light sensor is arranged in a stack over the proximity sensor with a position that allows infrared photons transmitted by the infrared photoemitter to be received by the reference infrared photodetector.

24 Claims, 5 Drawing Sheets

(56) References Cited

FOREIGN PATENT DOCUMENTS

| | | | |
|---|---|---|---|
| CN | 106024649 | A | 10/2016 |
| CN | 106774656 | A | 5/2017 |
| CN | 106847802 | A | 6/2017 |
| CN | 210123731 | U | 3/2020 |

OTHER PUBLICATIONS

EPO Extended Search Report and Written Opinion for EP18305439.4 dated Feb. 11, 2019 (12 pages).
First Office Action and Search Report for co-pending CN Appl. No. 201910252743.0 dated Dec. 24, 2020 (14 pages).

* cited by examiner

ELECTRONIC MODULE INCLUDING AN AMBIENT LIGHT SENSOR STACKED OVER A PROXIMITY SENSOR

PRIORITY CLAIM

This application claims the priority benefit of European Application for Patent No. 18305439.4, filed on Apr. 11, 2018, the content of which is hereby incorporated by reference in its entirety to the maximum extent allowable by law.

TECHNICAL FIELD

The invention relates to an electronic module and an apparatus comprising such electronic module.

BACKGROUND

Some apparatuses (for example, mobile phones, tablet computers, laptop computers, desktop computers, video game consoles, smart card readers, video cameras, televisions, vehicles, etc.) are equipped with ambient light sensors and proximity sensors to assist the operation of a camera. Ambient light sensors may, for example, be used to trigger a flash of the camera or adjust the brightness of the camera. Proximity sensors may be used to detect the presence of an object, measure the distance to the object, and adjust the position of a lens of the camera to capture the object in focus.

Ambient light sensors and proximity sensors are often part of separate electronic modules which increase the complexity, cost and size of apparatuses.

SUMMARY

In an embodiment, an electronic module comprises: an ambient light sensor comprising an ambient light photodetector; and a proximity sensor comprising an infrared photoemitter, a reference infrared photodetector and another infrared photodetector; wherein the ambient light sensor is arranged over the proximity sensor to allow infrared photons transmitted by the infrared photoemitter to be received by the reference infrared photodetector.

Such stack arrangement ensures an increased level of integration.

The ambient light sensor may be arranged over the reference infrared photodetector to reduce ambient light photons received by the reference infrared photodetector.

Such stack arrangement prevents the saturation of the reference infrared photodetector by ambient light photons.

Reducing ambient light photons received by the reference infrared photodetector may comprise blocking entirely, or at least substantially, ambient light photons received by the reference infrared photodetector.

The electronic module may comprise a light guide arranged between the ambient light sensor and the proximity sensor to convey infrared photons transmitted by the infrared photoemitter toward the reference infrared photodetector.

The light guide may provide a direct optical path between the infrared photoemitter and the reference infrared photodetector of the proximity sensor.

The electronic module may comprise an ambient light filter arranged to reduce ambient light photons received by the reference infrared photodetector.

The ambient light filter may be arranged on a back side of the light guide.

The electronic module may comprise an interposer arranged between the ambient light sensor and the proximity sensor over the light guide.

The interposer may be arranged in the optical path of the reference infrared photodetector.

The interposer may be made of silicon or ceramic.

In this way, the interposer may further reduce ambient light photons received by the reference infrared photodetector.

The electronic module may comprise an interposer arranged between the ambient light sensor and the proximity sensor beside the light guide.

The interposer may comprise one or more electrical connectors connected to one or more electrical connectors of the ambient light sensor, one or more electrical connectors of the proximity sensor and/or one or more electrical connectors of a substrate.

In this way, electric signal may be routed between the ambient light sensor, the proximity sensor and/or the substrate via the interposer.

The one or more electrical connectors of the interposer, ambient light sensor, proximity sensor or substrate may comprise an electrical pad or an electrical track.

The interposer may comprise an aperture in the optical path of the infrared photoemitter to allow infrared photons transmitted by the infrared photoemitter out of the electronic module.

In this way, the interposer may not obstruct the field of view of the infrared photoemitter.

The other infrared photodetector may be arranged to receive infrared photons transmitted by the photoemitter and reflected by an object.

The electronic module may comprise an ambient light filter in the optical path of the other infrared photodetector to reduce ambient light photons received by the other infrared photodetector.

The electronic module may comprise a package covering at least the infrared photoemitter and the other infrared photodetector of the proximity sensor.

The package may comprise a window arranged in the optical path of the infrared photoemitter to allow infrared photons transmitted by the infrared photoemitter out of the electronic module.

The package may comprise a window arranged in the optical path of the other infrared photodetector to allow infrared photons transmitted by the infrared photoemitter and reflected by an object to be received by the other infrared photodetector.

The package may cover the ambient light sensor and comprises a window arranged in the optical path of the ambient light photodetector to allow ambient light photons in the electronic module.

The electronic module may comprise a single window for both the infrared photoemitter and the ambient light sensor or a plurality of windows.

The package may comprise an opening arranged to expose a front side of the ambient light sensor.

A back side of the ambient light sensor may comprise one or more electrical connectors connected to one or more connectors of the interposer.

The package may comprise a wall delimiting: a first cavity comprising the ambient light sensor, the infrared photoemitter and the reference infrared photodetector of the proximity sensor; and a second cavity comprising the other infrared photodetector of the proximity sensor.

In this way, the package may provide optical isolation between the infrared photoemitter and the other infrared photodetector of the proximity sensor.

According to another aspect there is provided a system comprising any of the above electronic module.

The system may comprise a mobile phone, a tablet computer, a desktop computer, a laptop computer, a video game console, a video door or a smart watch, etc.

According to another aspect there is provided an electronic module comprising: a proximity sensor comprising an infrared photoemitter, a reference infrared photodetector and another infrared photodetector; and a light guide arranged to convey infrared photons transmitted by the infrared photoemitter toward the reference infrared photodetector.

The light guide may be made of glass.

The light guide may comprise a lens to direct infrared photons transmitted by the infrared photoemitter toward the reference infrared photodetector.

The electronic module may comprise: an ambient light sensor comprising an ambient light photodetector, wherein the ambient light sensor is arranged over the proximity sensor.

The light guide may be arranged between the ambient light sensor and the proximity sensor.

The electronic module may comprise an interposer arranged between the ambient light sensor and the proximity sensor over the light guide.

The electronic module may comprise an interposer arranged between the ambient light sensor and the proximity sensor beside the light guide.

The interposer may be arranged in the optical path of the reference infrared photodetector.

The interposer may comprise one or more electrical connectors connected to one or more electrical connectors of the ambient light sensor, one or more electrical connectors of the proximity sensor and/or one or more electrical connectors of a substrate.

The interposer may comprise an aperture in the optical path of the infrared photoemitter to allow infrared photons transmitted by the infrared photoemitter out of the electronic module.

The other infrared photodetector may be arranged to receive infrared photons transmitted by the photoemitter and reflected by an object.

The electronic module may comprise an ambient light filter in the optical path of the other infrared photodetector to reduce ambient light photons received by the other infrared photodetector.

The electronic module may comprise a package covering at least the infrared photoemitter and the other infrared photodetector of the proximity sensor.

The package may comprise a window arranged in the optical path of the infrared photoemitter to allow infrared photons transmitted by the infrared photoemitter out of the electronic module.

The package may cover the ambient light sensor and comprises a window arranged in the optical path of the ambient light photodetector to allow ambient light photons in the electronic module.

The package may comprise an opening arranged to expose a front side of the ambient light sensor.

The package may comprises a wall delimiting: a first cavity comprising the ambient light sensor, the infrared photoemitter and the reference infrared photodetector of the proximity sensor; and a second cavity comprising the other infrared photodetector of the proximity sensor.

BRIEF DESCRIPTION OF THE DRAWINGS

Reference will now be made, by way of example only, to the accompanying drawings in which.

DETAILED DESCRIPTION

A concept associated with the following embodiments relates to the integration of an ambient light sensor and a proximity sensor in an electronic module no larger than the electronic module of a conventional proximity sensor. Moreover, a stacking approach used therein may ensure that all or at least some of the following requirements are met:

a field of view of an infrared photoemitter is not obstructed;

a field of view of an infrared photodetector is not obstructed;

a field of view of an ambient light sensor is not obstructed;

an infrared photodetector is optically isolated from the infrared photoemitter;

a direct optical path exists between the reference infrared photodetector and the infrared photoemitter;

ambient light photons received by the reference infrared photodetector are substantially blocked to protect the reference infrared photodetector against saturation;

a size of a package is minimized; and a cost of the electronic module is minimized.

FIGS. 1 to 4 show an electronic module 2 according to a first embodiment disclosed herein. The electronic module 2 may be used in an apparatus such as a smart card reader, a mobile phone, a tablet computer, a laptop computer, a desktop computer, a smart watch, a video game console, etc.

The electronic module 2 comprises a substrate 4 (shown on FIGS. 1 to 4). The substrate 4 may be made of ceramic, FR4 or other material. The substrate 4 comprises one or more pads 6 (shown on FIG. 2) to convey electric signals (for example, input, output, power or ground). The pads 6 are arranged on a front side of the substrate 4. The pads 6 may be formed by depositing a metal layer on the front side of the substrate 4 and etching the metal layer. Alternatively or additionally, the substrate 4 may comprise tracks or other types of electric connectors to convey electric signals (for example, input, output, power or ground).

The electronic module 2 comprises a proximity sensor 8 (in the form of an integrated circuit chip as shown on FIGS. 1, 2 and 4) configured to detect an object in proximity of the electronic module 2 and/or measure a distance between the electronic module 2 and the object. The proximity sensor 8 may be arranged on the front side of the substrate 4. Here, the proximity sensor 8 directly lies on the front side of the substrate 4. The proximity sensor 8 is arranged to leave the pads 6 of the substrate 4 unobstructed to allow wire bonding.

Figure 1:
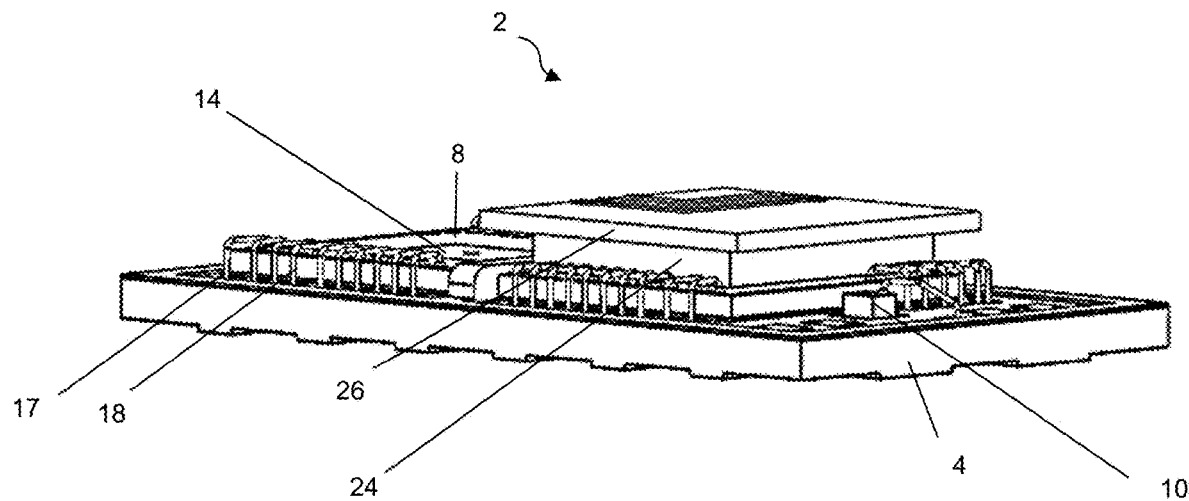
FIG. 1 shows a perspective view of an example of an electronic module according to a first embodiment disclosed herein.
Figure 2:
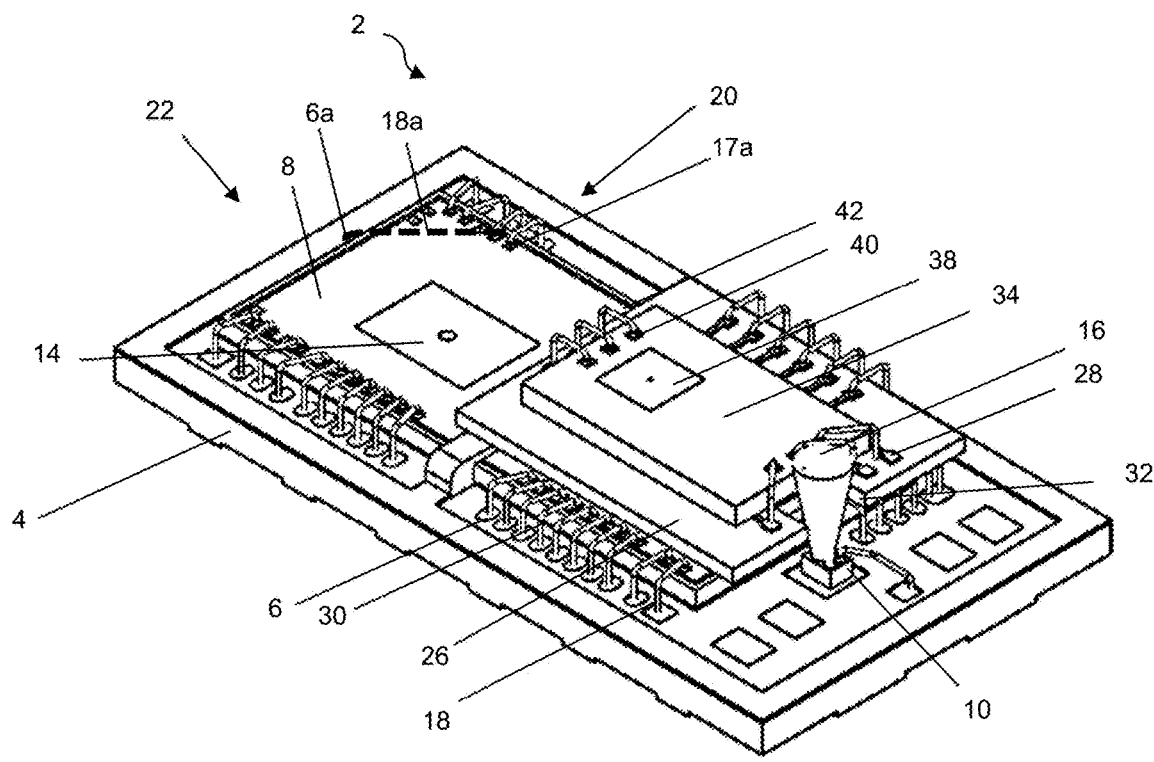
FIG. 2 shows a perspective view of the electronic module of FIG. 1.
Figure 3:
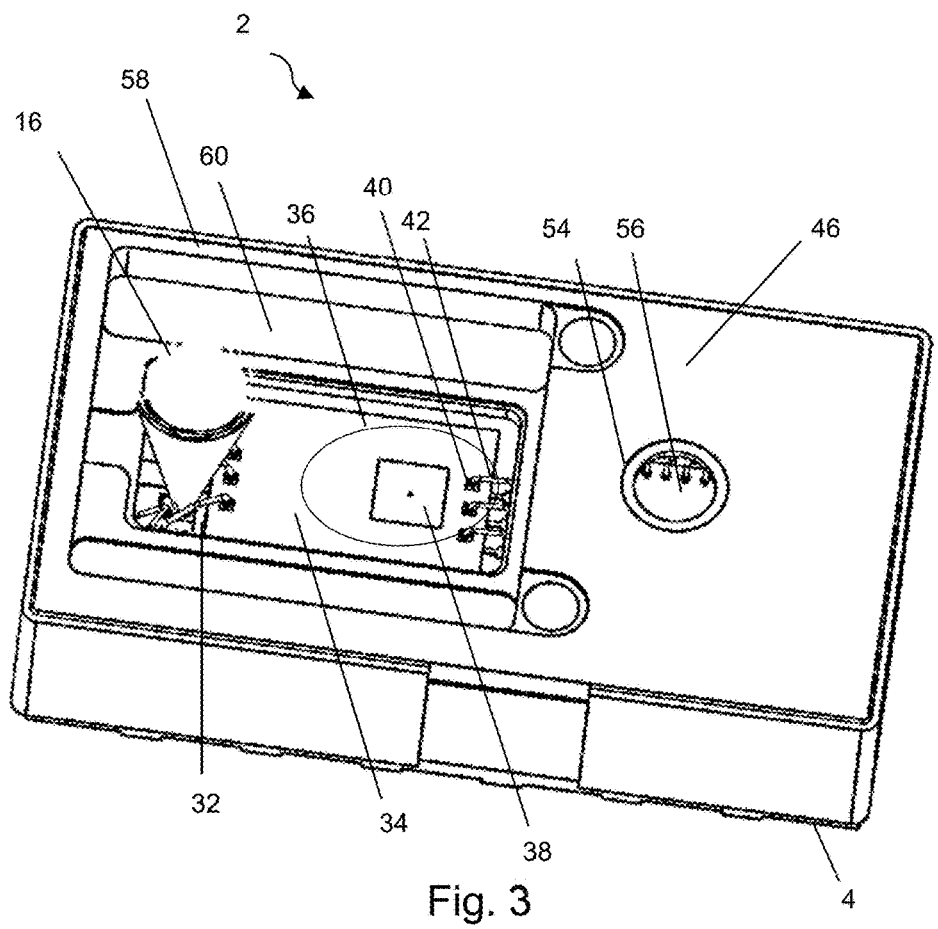
FIG. 3 shows a perspective view of the electronic module of FIG. 1.
Figure 4:
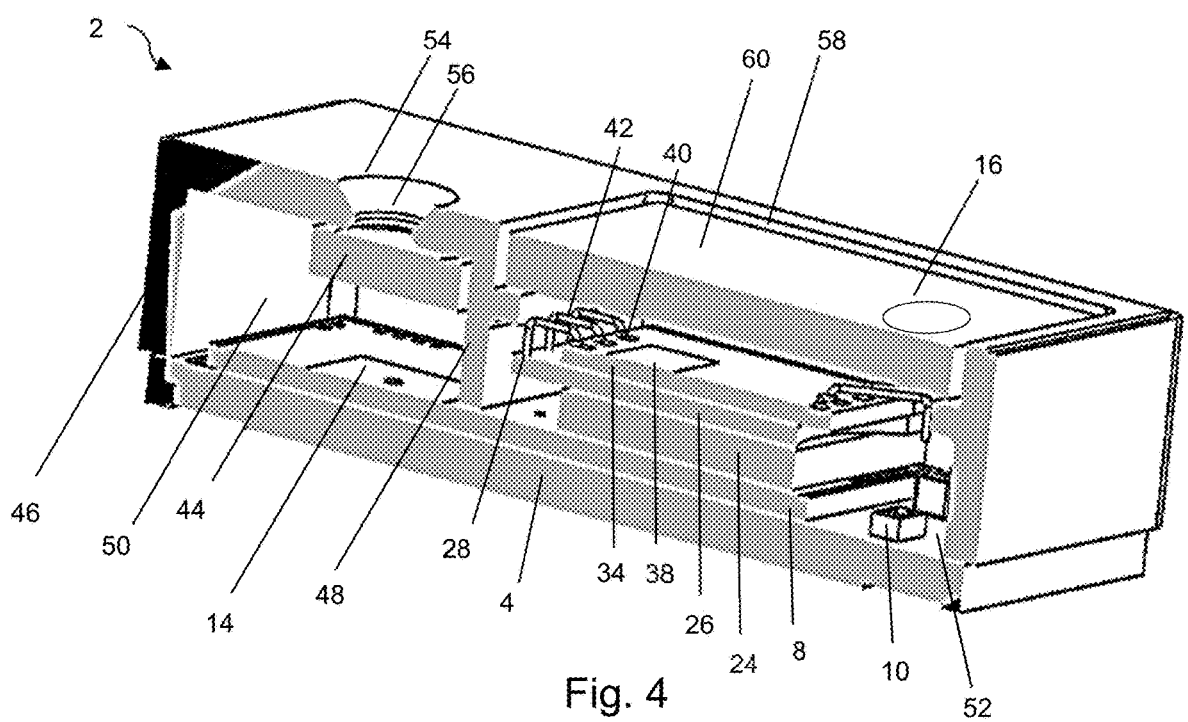
FIG. 4 shows a transversal view of the electronic module of FIG. 1.

The proximity sensor 8 comprises an infrared photoemitter 10 (in the form of an integrated circuit chip as shown on FIGS. 1, 2 and 4), a reference infrared photodetector 12 (hidden on FIGS. 1 to 4 but apparent on FIGS. 8 to 10) and another infrared photodetector 14 (as shown on FIGS. 1, 2 and 4). Here, the proximity sensor 8 is a time-of-flight sensor but other types of proximity sensors could be used.

The infrared photoemitter 10 is configured to emit infrared photons (for example, 800 nm to 990 nm wavelength) toward an object. The infrared photoemitter 10 comprises a field of view 16 or emission cone (shown on FIGS. 2, 3 and 4). Here, the infrared photoemitter 10 is a vertical-cavity surface-emitting laser (VCSEL) but other types of infrared photoemitter could be used.

The reference infrared photodetector 12 is configured to receive infrared photons directly emitted by the infrared photoemitter 10 (i.e., as opposed to infrared photons emitted by the infrared photoemitter 10 and reflected by an object). The reference infrared photodetector 12 comprises a field of view or reception cone (not shown). Here, the reference infrared photodetector 12 comprises an array of infrared pixels such as Single Photo Avalanche Diodes (SPADs) and associated circuitry. It will be understood that another type of infrared photodetector could be used.

SPADs are well-known in the art and therefore their functioning is not discussed in detail. The associated circuitry may comprise a readout unit configured to selectively readout the SPADs. Reading out a SPAD typically comprises detecting a pulse generated by the absorption of an infrared photon directly emitted by the infrared photoemitter 10 and determining a reference time (i.e., time of absorption). The associated circuitry may also comprise a control unit configured to selectively control the SPADs. Controlling a SPAD typically comprises quenching and resetting the SPAD after generating a pulse.

Unlike the reference infrared photodetector 12, the infrared photodetector 14 is not configured to receive infrared photons directly emitted by the infrared photoemitter 10. The infrared photodetector 14 is configured to receive infrared photons emitted by the infrared photoemitter 10 and reflected by an object. The infrared photodetector 14 comprises a field of view or reception cone (not shown).

Like the reference infrared photodetector 12, the infrared photodetector 14 comprises an array of infrared pixels such as SPADs and associated circuitry. The associated circuitry may comprise a readout unit configured to selectively readout the SPADs. Reading out a SPAD typically comprises detecting a pulse generated by the absorption of an infrared photon emitted by the infrared photoemitter 10 and reflected by an object, determining a time (i.e., time of absorption), determining a time-of-flight based on the reference time and the determined time and determining a distance to the object based on the time-of-flight. The associated circuitry may also comprise a control unit configured to selectively control the SPADs. Controlling a SPAD typically comprises quenching and resetting the SPAD after generating a pulse.

The proximity sensor 8 comprises a plurality of pads 17 (shown on FIGS. 1 and 2) to convey electric signals (for example, input, output, power or ground). Here, the pads 17 are arranged on the front side of the proximity sensor 8. The pads 17 form a ring on the perimeter or periphery of the front side of the proximity sensor 8. Alternatively or additionally, the proximity sensor 8 may comprise tracks or other types of electric connector to convey electric signals (for example, input, output, power or ground).

The electronic module 2 comprises a plurality of wires 18 (shown on FIGS. 1 and 2) connecting the pads 17 of the proximity sensor 8 to the pads 6 of the substrate 4. The wires 18 may be connected using wire bonding techniques that are well understood in the semiconductor packaging industry.

In an implementation, the wires 18 may be arranged so that at least one side 20 (shown on FIG. 2) of the proximity sensor 8 is left free of wire bonding or the number of wire bonding is reduced. For example, at least one pad 17a along the at least one side 20 of the proximity sensor 8 may be connected to a pad 6a of the substrate 4 along an adjacent side 22 by a wire 18a. In this way, the size of the electronic module 2 may be reduced.

The electronic module 2 comprises a light guide 24 (shown on FIGS. 1 and 4) configured to convey infrared photons emitted by the infrared photoemitter 10 toward the reference photodetector 12. Here, the light guide 24 is arranged on a front side of the proximity sensor 8 and lies directly over the reference infrared photodetector 12. The light guide 24 is arranged within the ring formed by the pads 17 of the proximity sensor 8 to leave these pads 17 unobstructed and allow wire bonding. The light guide 24 may be made of glass or other suitable material. The light guide 24 may comprise a lens (for example, converging lens) to direct infrared photons transmitted by the infrared photoemitter 10 toward the reference infrared photodetector.

The electronic module 2 comprises an ambient light filter (not shown) configured to allow infrared light photons to be received by the reference infrared photodetector 12 while reducing ambient light photons received by the reference infrared photodetector 12. Such ambient light photons may otherwise saturate the reference infrared photodetector 12 which would deteriorate the functioning of the proximity sensor 8. The ambient light filter may be a high pass filter (for example, pass wavelengths in the band close to that of the reference infrared photoemitter 12 and above) or a band pass filter (for example, pass wavelengths only in the band close to that of the reference infrared photoemitter 12). The ambient light filter may be arranged in the optical path of the reference infrared photodetector 12. Here, the ambient light filter is arranged between a front side of the proximity sensor 8 and a back side of the light guide 24. For example, the ambient light filter may be a coating applied on the back side of the light guide 24.

The electronic module 2 comprises an interposer 26 (shown on FIGS. 1, 2 and 4) configured to adjust a distance between the proximity sensor 8 and an ambient light sensor 34 (shown on FIGS. 2, 3 and 4), to route signals between the ambient light sensor 34 and the substrate 4 and/or to reduce ambient light photons received by the reference infrared photodetector 12. It will be understood that in other embodiments the interposer 26 may be configured to achieve only some of these functions.

The interposer 26 is arranged over the light guide 24 in the optical path of the reference infrared photodetector 12 to reduce ambient light photons received by the reference infrared photodetector 12. Here, the interposer 26 lies directly over the light guide 24.

The interposer 26 comprises one or more pads 28 (shown on FIGS. 2 and 4) to convey electric signals (for example, input, output, power or ground). Here, the pads 28 are arranged on a front side of the interposer 26. The pads 28 may be formed by depositing a metal layer on the front side of the interposer 28 and etching the metal layer. In this way, signals may be routed between the ambient light sensor 34 and the substrate 4. Alternatively or additionally, the interposer 26 could comprise tracks or other types of electric connector to convey electric signals (for example, input, output, power or ground).

The electronic module 2 comprises a plurality of wires 30 (shown on FIG. 2) connecting the pads 28 of the interposer 26 to the pads 6 of the substrate 4. The wires 30 may be connected using wire bonding techniques that are well understood in the semiconductor packaging industry.

The interposer 26 may be deliberately oversized to maximize the potential for signal distribution and to facilitate the bonding of the wires 30 connecting the pads 28 of the interposer 26 to the pads 6 of the substrate 4. The interposer 26 is, however, designed to avoid impacting the bonding of the wires 18 connecting the proximity sensor 8 to the substrate 4 and to avoid obstructing the field of view 16 of the infrared photoemitter 10. Here, the interposer 26 is arranged over the infrared photoemitter 10 and comprises an aperture 32 or hole (shown on FIGS. 2 and 3) dimensioned to leave the field of view 16 of the infrared photoemitter 10 unobstructed.

The interposer 26 may be made of ceramic or silicon. A silicon interposer is advantageous in that the thickness of the interposer 26 may be set with greater accuracy. Indeed, a silicon interposer 26 may be back lapped and therefore may achieve almost any thickness. By contrast, a ceramic interposer may be limited to discrete thicknesses depending on the base material layer thickness.

For a silicon interposer, a silicon wafer may be etched to delimit the perimeter of the aperture 32 and the perimeter of the interposer 26. For example, the silicon wafer may be etched using deep reaction ion etching (DRIE) techniques. Such techniques allow etching to a depth of around 190 µm very effectively. The silicon wafer can then be back lapped to clear the aperture 32 and to separate or singulate the silicon interposer 26. Such process is known as "Dice before Grind". With such process, the silicon interposer has an excellent mechanical precision in terms of overall dimensions, aperture size, positional accuracy and thickness.

It will be understood that DRIE is one possible option for dicing but other options like laser or plasma may be used as well.

It will be also understood that the silicon wafer may be back lapped first and then etched. Such process is known as "Dice after Grind". Because the silicon wafer is back lapped first it may be thin enough to user laser or plasma dicing which should ensure good yield despite a potentially less uniform shape.

For a ceramic interposer the aperture 32 can be formed by punching the ceramic interposer prior to co-firing.

The electronic module 2 comprises the ambient light sensor 34 (in the form of an integrated circuit chip as shown on FIGS. 2, 3 and 4) configured to measure a level of ambient light. The ambient light sensor 34 comprises a field of view 36 (shown on FIG. 3). The field of view 36 of the ambient light sensor 34 is typically larger than the field of view 16 of the infrared photoemitter 10, the field of view of the reference infrared photodetector 12 and the field of view of the infrared photodetector 14. The field of view 36 of the ambient light sensor 34 may be greater than or equal to 60° from the perpendicular. By contrast, the field of view of the reference infrared photodetector 12 may be comprised between 5° and 60° from the perpendicular and the field of view of the infrared photodetector 14 may be comprised between 5° and 60° from the perpendicular, each depending upon the specific application of the proximity sensor.

The ambient light sensor 34 is arranged over the interposer 26. Here, the ambient light sensor 34 lies directly over a front side of the interposer 26. The ambient light sensor 34 comprises an ambient light photodetector 38 (shown on FIGS. 2, 3 and 4) and associated logic. For example, the ambient light sensor 34 may be a light to frequency sensor. Such type of sensor is well-known and therefore not discussed in detail. It will be understood that other type of ambient light sensors may be used.

The ambient light sensor 34 comprises a plurality of pads 40 (shown on FIGS. 2, 3 and 4) to convey electric signals (for example, input, output, power or ground). Here, the pads 40 are arranged on a front side of the ambient light sensor 34. Alternatively or additionally, the ambient light sensor 34 may comprise tracks or other types of electric connectors to convey electric signals (for example, input, output, power or ground).

The electronic module 2 comprises a plurality wires 42 (shown on FIGS. 2, 3 and 4) connecting the pads 40 of the ambient light sensor 34 to the pads 28 of the interposer 26. The wires 42 may be connected using cantilever wire bonding techniques. Using wire bonding techniques allow the use of a "bare die" ambient light sensor 34 eliminating the cost of a separate package dedicated to the ambient light sensor 34.

The electronic module 2 comprises an ambient light filter 44 (shown on FIG. 4) configured to allow infrared light photons to be received by the infrared photodetector 14 while reducing ambient light photons received by the reference infrared photodetector 14. Such ambient light photons may otherwise saturate the infrared photodetector 14. The ambient light filter 44 may be a high pass filter (for example, pass wavelengths in the band close to that of the reference infrared photoemitter 12 and above) or a band pass filter (for example, pass wavelengths only in the band close to that of the reference infrared photoemitter 12). The ambient light filter 44 is arranged in the optical path of the infrared photodetector 14. The ambient light filter 44 may be a coating applied on the front side of a piece of glass or may take other forms.

The electronic module 2 comprises a package 46 (shown on FIG. 4) configured to house and protect the ambient light filter 44, the ambient light sensor 34, the interposer 26, the light guide 24 and the proximity sensor 8. The package 46 forms a shell over the ambient light filter 44, the ambient light sensor 34, the interposer 26, the light guide 24, proximity sensor 8 and the substrate 4. The package 46 may be glued to the substrate 4. Here, the package 46 carries the ambient light filter 44 (i.e. the ambient light filter 44 is attached to the package 46).

The package 46 comprises side walls substantially perpendicular to the substrate 4 and a front wall substantially parallel to the substrate 4. The package 46 comprises an internal wall 48 substantially perpendicular to the front wall delimiting a first cavity 50 and a second cavity 52 within the package 46. The first cavity 50 contains the ambient light filter 44 and the infrared photodetector 14. The second cavity 52 contains the ambient light sensor 34, the interposer 26, the light guide 24 and the reference photodetector 12.

The internal wall 48 provides optical isolation between the infrared photodetector 14 and the infrared photoemitter 10.

The package 46 comprises an aperture 54 formed in the front wall and leading to the first cavity 50. The aperture 54 may be arranged in the optical path of the ambient light filter 44 and the infrared photodetector 14. The aperture 54 may be dimensioned so as to leave the field of view of the infrared photodetector 14 unobstructed. The aperture 54 may comprise a window 56. The window 56 may be made of glass or other suitable material. The window 56 may be provided with optics such as diffractive optics (for example, using silicon on glass techniques), converging optics (for example, using silicon on glass techniques) or refractive optics (for example, using epoxy on glass techniques).

The package 46 comprises an aperture 58 formed in the front wall and leading to the second cavity 52. The aperture 58 may be arranged in the optical path of the ambient light sensor 34 and in the optical path of the infrared photoemitter 10. The aperture 58 may be dimensioned so as to leave the field of view 36 of the ambient light sensor 34 and the field of view 16 of the infrared photoemitter 10 unobstructed.

The thickness of the interposer 26 may be advantageously set so that the ambient light sensor 34 is brought as high as possible in the second cavity 52. In this way, the size of the aperture 58 can be minimized while ensuring the non-obstruction of the field of view 36 of the ambient light sensor 34.

The aperture 58 may comprise a window 60. The window 60 may be made of glass or other suitable material. Using a single window for both the ambient light sensor 34 and the infrared photoemitter 10 as opposed to using separate windows may reduce the cost of the package 46. The window 60 may be provided with optics such as diffractive optics (for example, using silicon on glass techniques), converging optics (for example, using silicon on glass techniques) or refractive optics (for example, using epoxy on glass techniques).

The electronic module 2 described above is advantageous in that it allows the integration of an ambient light sensor 34 and a proximity sensor 8 in a package 46 no larger than the package of a conventional proximity sensor. Moreover, the stacking approach used therein ensures that all or at least some of the following requirements are met:

The field of view 16 of the infrared photoemitter 10 is not obstructed;

The field of view of the infrared photodetector 14 is not obstructed;

The field of view 36 of the ambient light sensor 34 is not obstructed. For example, by adjusting the height of the ambient light sensor 34 in the package an existing ambient light sensor 34 may be used while ensuring that the field of view 36 of the ambient light sensor 34 is not obstructed;

The infrared photodetector 14 is optically isolated from the infrared photoemitter 10;

A direct optical path exists between the reference infrared photodetector 12 and the infrared photoemitter 10;

The ambient light photons received by the reference infrared photodetector 12 are substantially blocked to protect the reference infrared photodetector 12 against saturation;

The size of the package 46 is minimized; and

The cost of the electronic module 2 is minimized.

Figure 5:
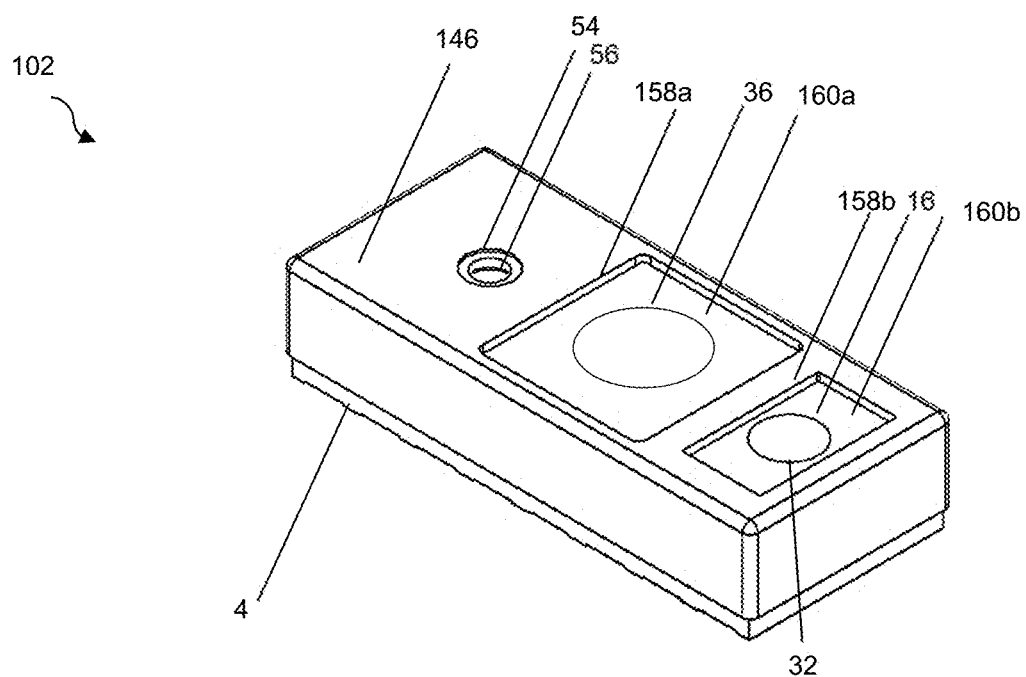
FIG. 5 shows a perspective view of an example of an electronic module according to a second embodiment disclosed herein.

FIG. 5 shows an electronic module 102 according to a second embodiment disclosed herein. In this second embodiment, the package 46 is replaced by a 146 package.

The package 146 differs from the package 46 in that it comprises an aperture 158a formed in the front wall leading to the second cavity 52. The aperture 158a is arranged in the optical path of the ambient lightسensor 34. The aperture 158a may be dimensioned so as to leave the field of view 36 of the ambient light sensor 34 unobstructed. The aperture 158a may comprise a window 160a. The window 160a may be made of glass or other suitable material. The window 160a may be provided with optics such as diffractive optics (for example, using silicon on glass techniques), converging optics (for example, using silicon on glass techniques) or refractive optics (for example, using epoxy on glass techniques).

The package 146 comprises an aperture 158b formed in the front wall leading to the second cavity 52. The aperture 158b is arranged in the optical path of the infrared photoemitter 10. The aperture 158b may be dimensioned so as to leave the field of view 16 of the infrared photoemitter 10 unobstructed. The aperture 158b may comprise a window 160b. The window 160b may be made of glass. The window 160b may be provided with optics such as diffractive optics (for example, using silicon on glass techniques), converging optics (for example, using silicon on glass techniques) or refractive optics (for example, using epoxy on glass techniques).

Figure 6:
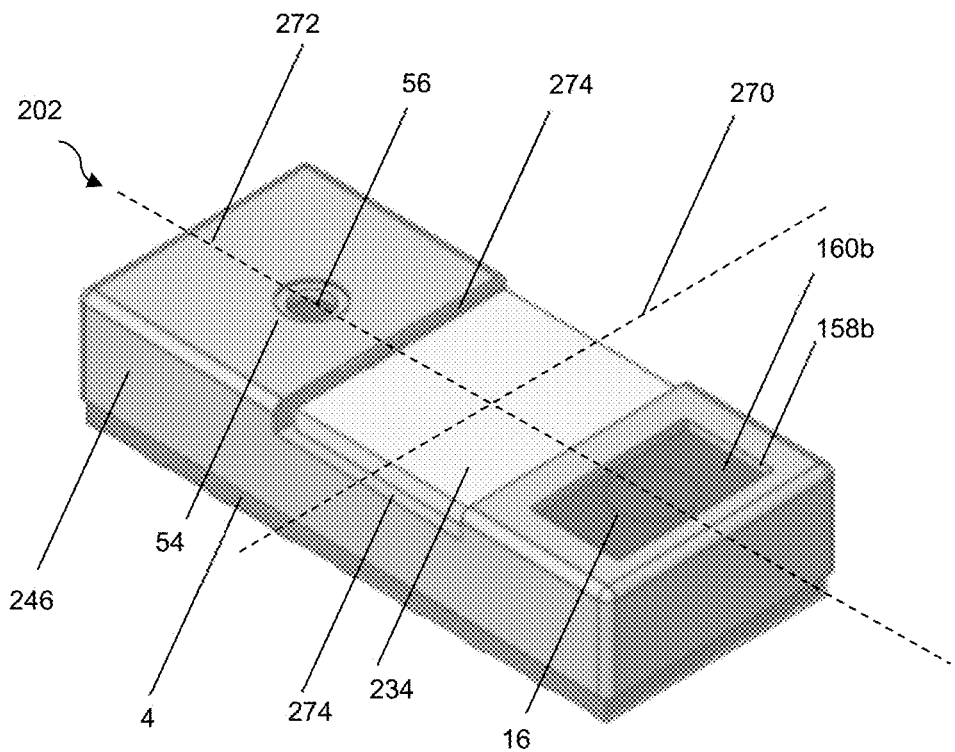
FIG. 6 shows a perspective view of an example of an electronic module according to a third embodiment disclosed herein.

FIG. 6 shows an electronic module 202 according to a third embodiment disclosed herein. In the third embodiment, the ambient light sensor 34 is replaced by a Wafer Level Chip Scale Package (WLCSP) ambient light sensor 234 and the package 46 is replaced by a package 246.

Unlike the ambient light sensor 34, the WLCSP ambient light sensor 234 is not a bare die ambient light sensor. The WLCSP ambient light sensor 234 comprises a separate package. The WLCSP ambient light sensor 234 may comprise pads to convey electric signals (for example, input, output, power and ground) on a rear side. The pads of the WLCSP ambient light sensor 234 may be metallized. The pads of the WLCSP ambient light sensor 234 may comprise solder paste dots or bumps to bond the pads of the WLCSP ambient light sensor 234 to pads of the interposer 26. The pattern of the pads of the WLCSP ambient light sensor 234 may match the pattern of the pads of the interposer 26.

The WLCSP ambient light sensor 234 may be positioned so that a longitudinal axis 270 of the WLCSP ambient light sensor 234 forms a right angle (for example, 90°) with a longitudinal axis 272 of the package 246 (as shown of FIG. 6). Alternatively, the WLCSP ambient light sensor 234 may be rotated and positioned so that the longitudinal axis 270 of the WLCSP ambient light sensor 234 is aligned with the longitudinal axis 272 of the package 246.

The package 246 may differ from the package 146 in that it no longer comprises the aperture 158a and the window 160a. Instead, the package 246 comprises an opening 274 arranged to expose the WLCSP ambient light sensor 234 (or the front side of the interposer 26 if the WLCSP ambient light sensor 234 is removed). The opening 274 is however dimensioned to ensure that the wires 30 connecting the pads 28 of the interposer 26 to the tracks 6 of the substrate 4 are protected.

The package 246 may be mounted before the WLCSP ambient light sensor 234 is mounted on the interposer 26 and the solder paste dots or bumps of the WLCSP ambient light sensor 234 are reflowed. Alternatively, the package 246 may be mounted after the WLCSP ambient light sensor 234 is mounted on the interposer 26 and the solder paste dots or bumps of the WLCSP ambient light sensor 234 are reflowed.

Figure 7:
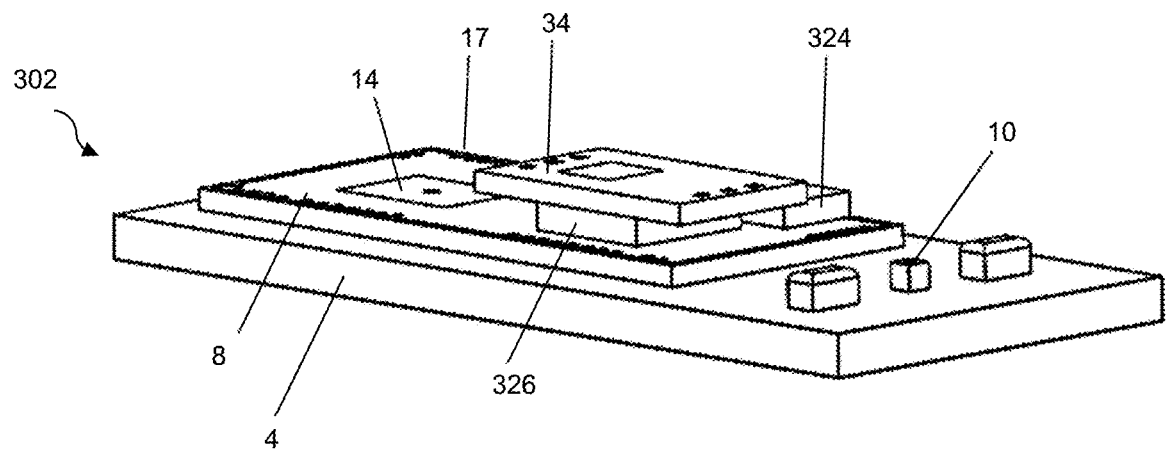
FIG. 7 shows a perspective view of an example of an electronic module according to a fourth embodiment disclosed herein.
Figure 8:
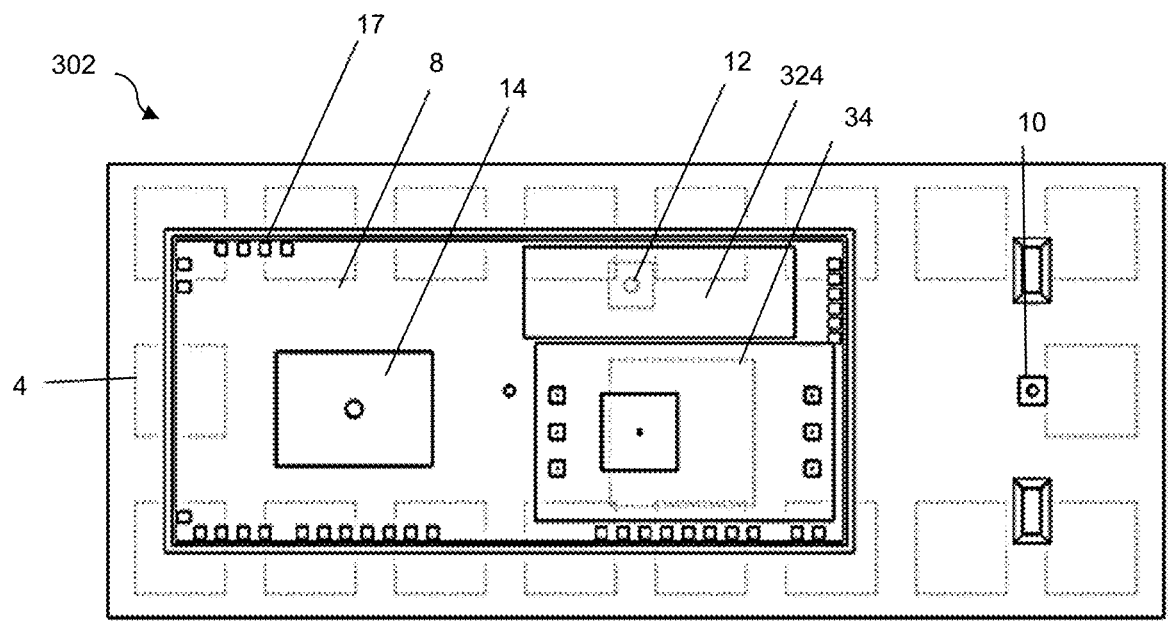
FIG. 8 shows a front view of the electronic module of FIG. 7.

FIGS. 7 and 8 show an electronic module 302 according to a fourth embodiment disclosed herein. In the fourth embodiment, the interposer 26 is replaced by an interposer

326. The light guide 24 is replaced by a light guide 324. The interposer 326 is still arranged between the proximity sensor 8 and the ambient light sensor 34 but beside the light guide 324 (as opposed to over the light guide 324). Moreover, the ambient light sensor 34 is arranged directly over the interposer 326. In some embodiment (not illustrated) the ambient light sensor 34 may be arranged directly over the light guide 324 in the optical path of the reference infrared photodetector 12. In this way, the ambient light sensor 34 may directly reduce the ambient light photons received by the reference infrared photodetector 12.

Figure 9:
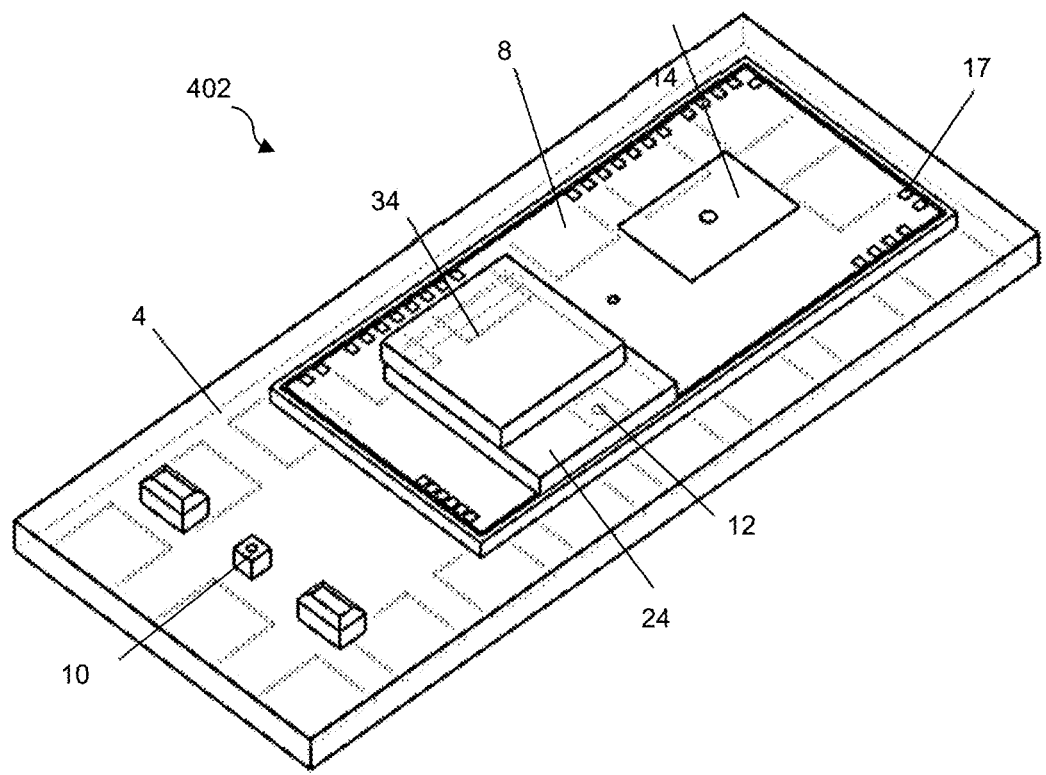
FIG. 9 shows a perspective view of an example of an electronic module according to a fifth embodiment disclosed herein.
Figure 10:
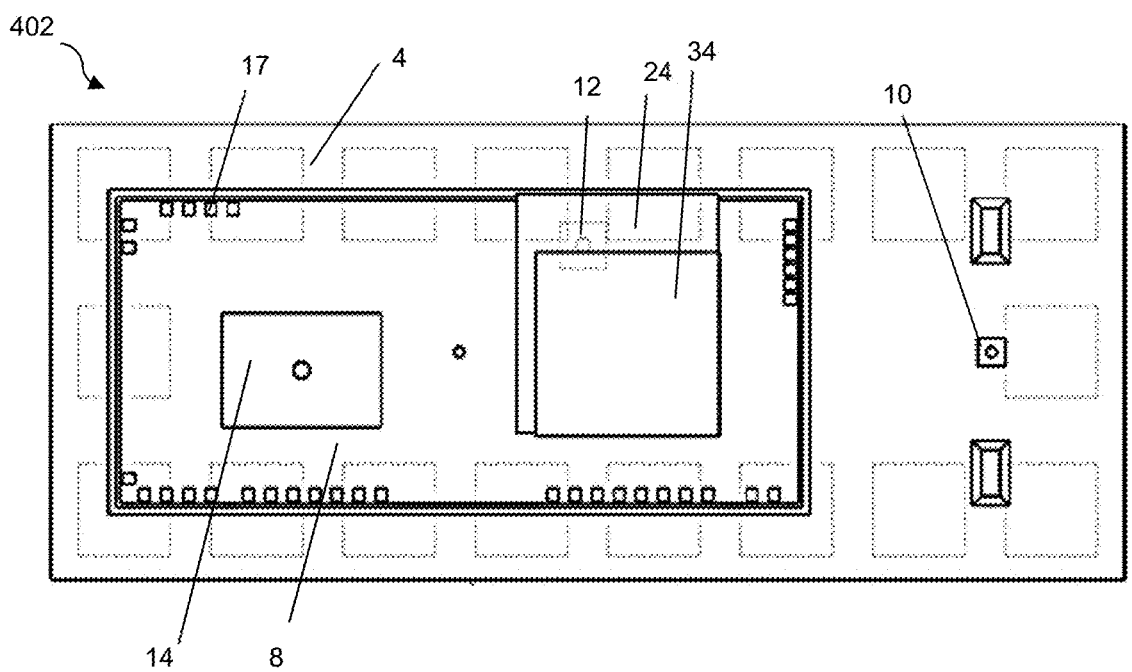
FIG. 10 shows a front view of the electronic module of FIG. 1.

FIGS. 9 and 10 show an electronic module 402 according to a fifth embodiment disclosed herein. In the fifth embodiment, the interposer 26 is omitted. The ambient light sensor 34 is arranged directly over the light guide 24. In some embodiment, the ambient light sensor 34 may be arranged in the optical path of the reference infrared photodetector 12. In this way, the ambient light sensor 34 may directly reduce the ambient light photons received by the reference infrared photodetector 12.

Various embodiments with different variations have been described here above. It should be noted that those skilled in the art may combine various elements of these various embodiments and variations.

Such alterations, modifications, and improvements are intended to be part of this disclosure, and are intended to be within the scope of the claims. Accordingly, the foregoing description is by way of example only and is not intended to be limiting. The invention is limited only as defined in the claims and the equivalents thereto.

The invention claimed is:

1. An electronic module, comprising:
   an ambient light sensor comprising an ambient light photodetector; and
   a proximity sensor comprising an infrared photoemitter configured to emit infrared photons, a reference infrared photodetector configured to directly receive infrared photons emitted by the infrared photoemitter and another infrared photodetector configured to indirectly receive infrared photons emitted by the infrared photoemitter and reflected from an object;
   wherein the ambient light sensor is arranged in a stack over the proximity sensor at a position which allows infrared photons transmitted by the infrared photoemitter to be directly received by the reference infrared photodetector.

2. The electronic module of claim 1, wherein the stack arrangement of the ambient light sensor over the reference infrared photodetector serves to reduce ambient light photons from being received by the reference infrared photodetector.

3. The electronic module according to claim 1, further comprising a light guide arranged in the stack between the ambient light sensor and the proximity sensor to convey infrared photons transmitted by the infrared photoemitter toward the reference infrared photodetector.

4. The electronic module according to claim 3, further comprising an interposer arranged in the stack between the ambient light sensor and the proximity sensor and extending over the light guide.

5. The electronic module according to claim 4, wherein the interposer comprises one or more electrical connectors connected to one or more electrical connectors of the ambient light sensor, one or more electrical connectors of the proximity sensor and/or one or more electrical connectors of a substrate.

6. The electronic module according to claim 4, wherein the interposer comprises an aperture in the optical path of the infrared photoemitter to allow infrared photons transmitted by the infrared photoemitter out of the electronic module.

7. The electronic module according to claim 1, further comprising a light guide configured to convey infrared photons transmitted by the infrared photoemitter toward the reference infrared photodetector and an interposer arranged in the stack between the ambient light sensor and the proximity sensor and positioned beside the light guide.

8. The electronic module according to claim 7, wherein the interposer comprises one or more electrical connectors connected to one or more electrical connectors of the ambient light sensor, one or more electrical connectors of the proximity sensor and/or one or more electrical connectors of a substrate.

9. The electronic module according to claim 7, wherein the interposer comprises an aperture in the optical path of the infrared photoemitter to allow infrared photons transmitted by the infrared photoemitter out of the electronic module.

10. The electronic module according to claim 1, further comprising an ambient light filter in the optical path of the another infrared photodetector to reduce ambient light photons received by the another infrared photodetector.

11. The electronic module according to claim 1, further comprising a package covering at least the infrared photoemitter and the another infrared photodetector of the proximity sensor.

12. The electronic module according to claim 11, wherein the package comprises a window arranged in the optical path of the infrared photoemitter to allow infrared photons transmitted by the infrared photoemitter out of the electronic module.

13. The electronic module according to claim 11, wherein the package covers the ambient light sensor and comprises a window arranged in the optical path of an ambient light photodetector to allow ambient light photons in the electronic module.

14. The electronic module according to claim 11, wherein the package comprises an opening arranged to expose a front side of the ambient light sensor.

15. The electronic module according to claim 11, wherein the package comprises a wall delimiting:
   a first cavity comprising the ambient light sensor, the infrared photoemitter and the reference infrared photodetector of the proximity sensor; and
   a second cavity comprising the another infrared photodetector of the proximity sensor.

16. An electronic module, comprising:
   a support substrate having a top surface;
   a first integrated circuit die mounted to the top surface of the support substrate, the first integrated circuit die including an infrared photoemitter;
   a second integrated circuit die mounted to the top surface of the support substrate, the second integrated circuit die including a reference infrared photodetector and another infrared photodetector;
   a third integrated circuit die including an ambient light sensing photodetector;
   wherein the third integrated circuit die is mounted in a stacked arrangement over the reference infrared photodetector of the second integrated circuit die to: a) permit infrared photons emitted from the infrared photoemitter to directly reach the reference infrared photodetector and b) block ambient light from reaching the reference infrared photodetector.

17. The electronic module of claim 16, further comprising a light guide in the stacked arrangement positioned between the second and third integrated circuit dies to convey infrared photons from the infrared photoemitter toward the reference infrared photodetector.

18. The electronic module according to claim 17, further comprising an interposer in the stacked arrangement positioned between the second and third integrated circuit dies and extending over the light guide.

19. The electronic module according to claim 18, wherein the interposer comprises electrical connectors configured for making electrical connections to electrical connectors of the third integrated circuit die, electrical connectors of the second integrated circuit die and electrical connectors of the support substrate.

20. The electronic module according to claim 18, wherein the interposer comprises an aperture through which infrared photons emitted by the infrared photoemitter pass.

21. The electronic module according to claim 17, further comprising an interposer in the stacked arrangement positioned between the second and third integrated circuit dies and beside the light guide.

22. The electronic module according to claim 21, wherein the interposer comprises electrical connectors configured for making electrical connections to electrical connectors of the third integrated circuit die, electrical connectors of the second integrated circuit die and electrical connectors of the support substrate.

23. The electronic module according to claim 21, wherein the interposer comprises an aperture through which infrared photons emitted by the infrared photoemitter pass.

24. The electronic module according to claim 16, further comprising a package mounted to the support substrate and covering the first, second and third integrated circuit dies, said package including a first window arranged in the optical path of the infrared photoemitter and a second window arranged in the optical path of the ambient light sensing photodetector.

* * * * *